July 17, 1951          L. HUBERT          2,560,868
ELECTROMAGNETIC CLUTCH AND BRAKE
Filed April 11, 1945          3 Sheets-Sheet 1
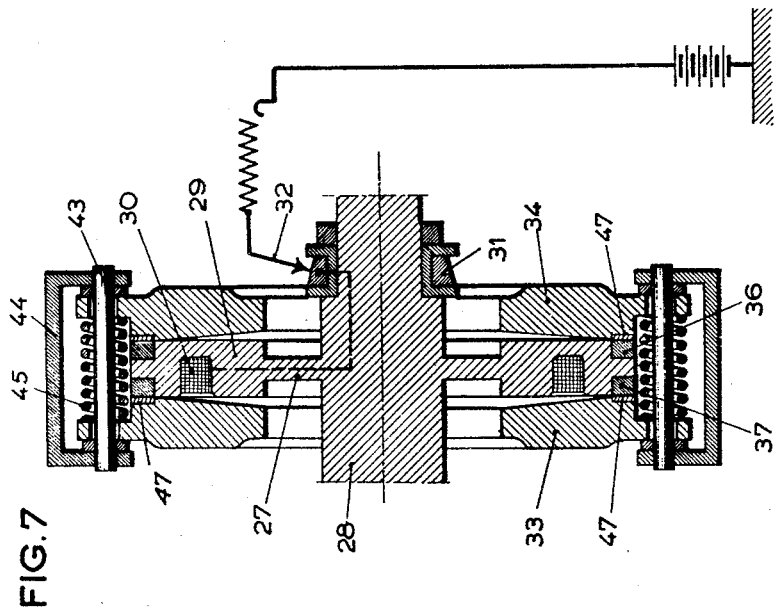
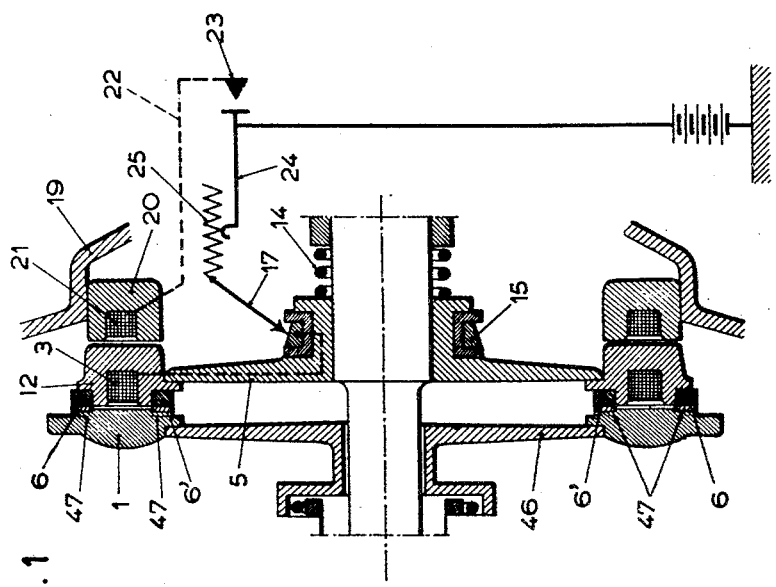

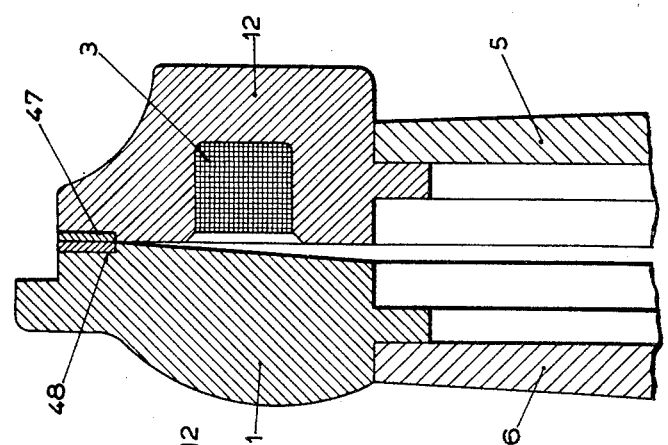
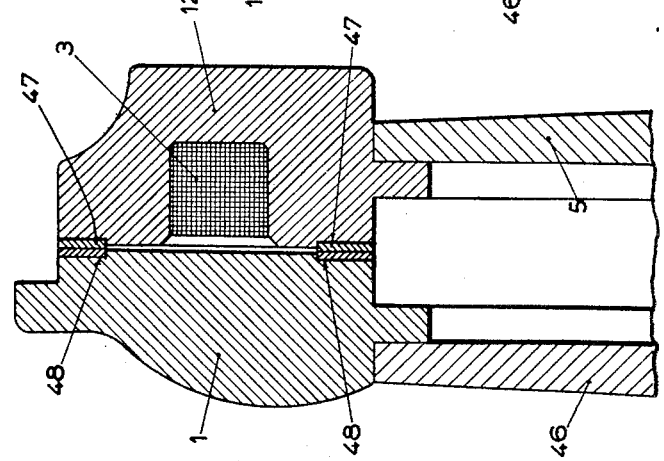
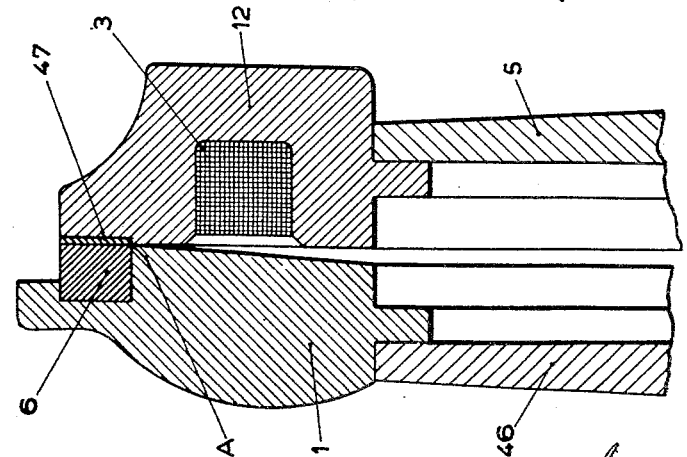

July 17, 1951 L. HUBERT 2,560,868
ELECTROMAGNETIC CLUTCH AND BRAKE
Filed April 11, 1945 3 Sheets-Sheet 3

Inventor:
L. Hubert
By E. F. Wenderoth
Atty

Patented July 17, 1951

2,560,868

UNITED STATES PATENT OFFICE 2,560,868

ELECTROMAGNETIC CLUTCH AND BRAKE

Louis Hubert, Paris, France, assignor to Societe d'Application des Brevets Cotal, Neuilly-sur-Seine, France, a corporation of France Application April 11, 1945, Serial No. 587,791
In France October 19, 1943

Section 1, Public Law 690, August 8, 1946
Patent expires October 19, 1963

7 Claims. (Cl. 192—84)

This invention relates to an improvement in electromagnetic clutches and brakes.

An object of the invention is to improve clutches and brakes so that the air gap ordinarily existing between the cooperating elements is eliminated thereby providing a construction in which there is no initial shock upon coupling of the contacting elements.

A further object is to provide metallic rings embedded in the contacting elements, one of which is preferably of a hard metal such as steel while the other cooperating ring may be of a metal such as bronze which will provide a smooth and uniform friction.

A further object of the invention is to provide a construction wherein a simple frictional ring may be utilized and such ring is mounted either upon the element serving as the electromagnet or upon the element serving as the armature and in which the material and size of the ring is chosen in accordance with the type of friction, the power to be transmitted, the speed of the rotating shaft, the type of lubrication and the durability desired, etc.

A still further object of the invention consists in eliminating the rings mentioned above and merely treating the cooperating surfaces of the contacting elements in a desired manner so as to obtain the optimum results. Such treatment may involve a coating of the desired surface or surfaces of the contacting elements or a tempering or any other treatment.

A still further object of the invention is to provide a conical contour to those portions of the contacting elements which do not come into contact in order to improve the functional characteristics of the clutch or brake and also to permit an easier operation of the contacting element.

With the above and other objects in view which will become apparent from the detailed description below various forms of embodiments of the invention are shown in the drawings in which:

Fig. 1 is a cross-sectional view with parts diagrammatically shown illustrating one form of the invention as applied to an electromagnetic clutch.

Fig. 2 is a partial cross-sectional view illustrating a modification of the contacting surfaces.

Fig. 3 is a similar view to Fig. 2 showing a still further modification.

Fig. 4 is a similar view of another modification in the contacting frictional surfaces.

Fig. 7 is a cross-sectional view with parts shown diagrammatically of the invention as applied to an electromagnetic brake.

Figure 6:
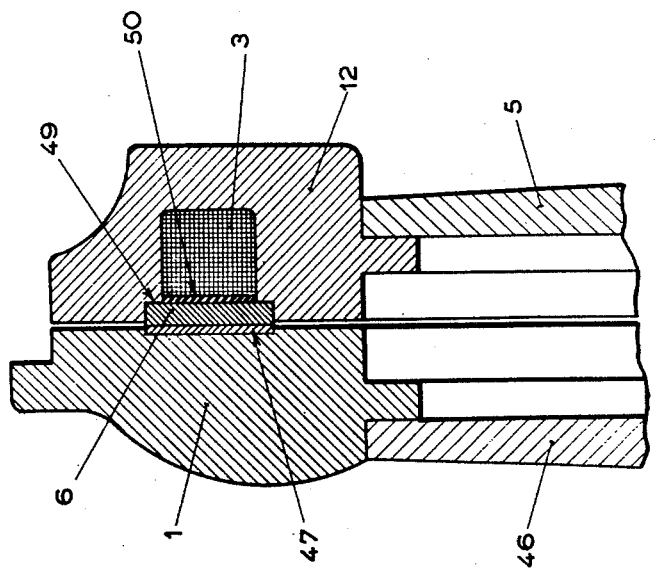
Fig. 6 is also a similar view illustrating another form of the invention.

In the construction shown in Fig. 1 the electromagnetic clutch comprises a plate 46 which may be somewhat deformable carrying the armature. The member to be driven is shown at 5 and such member has mounted thereon the annular electromagnet 12 wherein the coil 3 is positioned. The coil 3 is electrically connected to the slip ring 15 which is in contact with brush 17 connected to a rheostat 24, 25.

The electromagnet 12 is also recessed as shown to accommodate two rings 6 and 6' which may be constructed of bronze. On the armature 1 facing rings 6 and 6' are provided the surfaces 47 which surfaces are capable of frictional contact without injury. The surfaces 47 in this modification of the invention are obtained by modifying the characteristics of the steel either through a chemical process or a heating treatment or by means of a deposit of a metallic coating such as oxidized aluminum or similar substances. In any case the surface obtained at 47 should be polished as perfectly as possible in order to obtain at the initial contact of the cooperating elements a somewhat smooth and uniform sliding and a very slight driving couple.

The active surface of the armature 1 which secures a feeble sliding action and has a strong coefficient of friction is shaped, after the formation of the surfaces 47, in such manner that contact is very slight and the entire surface of the armature is in a plane perpendicular to the clutch axis.

A spring 14 urges the member 5 to the left as shown in Fig. 1 so as to secure a good contact and eliminate the air gap when the device is nonoperative but without exerting a pressure which would create a prejudicial torsional movement. On the casing 19 partially shown in Fig. 1 there is provided an electromagnet 20 whose coil 21 is connected to the wire 22 which in turn is connected to the contact 23. The electromagnet 20 is mounted as shown behind the electromagnet 12 and locks the member 5 when energized.

In Fig. 2 a modification is shown in which the annular rings have been eliminated and replaced by annular sliding surfaces. The annular surfaces 47 in this modification are obtained for instance, by suitable heating and tempering of these portions while the surfaces 48 cooperating therewith may be secured by metallization.

In Fig. 3 a further modification is shown in which the face of the armature 1 facing the electromagnet 12 is shaped slightly conical from the point A toward the clutch axis while the ring 6 located therein has its face opposite the electromagnet 12 perpendicular to the rotational axis. Such a construction prevents the blunting or the dulling of the outer edge of the plate during operation which would be unavoidable if the entire surface had a conical configuration.

A still further modification is shown in Fig. 4 in which the sliding ring 6 is replaced by a sliding annular surface 48 located opposite the sliding annular surface 47.

Figure 5:
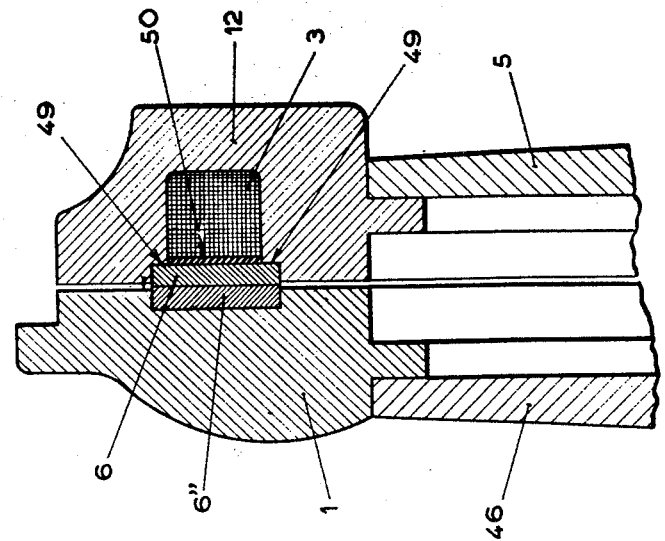
Fig. 5 is a similar view illustrating a still further modification.

Also in order to reduce the size of the device the rings and sliding surfaces may be disposed as shown in Figs. 5 and 6. In these two embodiments the sliding rings or surfaces may be located in the zone of the coil. In Fig. 5 a sliding ring 6'' and in Fig. 6 a sliding surface 47 have been located on the armature 1. In both of these modifications the sliding ring 6 constructed of a non-magnetic metal is embedded in a circular groove whose width is somewhat larger than the groove in which the coil 3 is disposed so that there is provided two shoulders 49 on both sides of the latter groove. In order that the pressure exerted by the ring 6 should not injure the coil 3 there is provided a protective coating 50 located in the same plane as the shoulders 49 and such coating may, for example, be obtained by bakelization.

The operation of the improved device as described above is as follows:

When the coil 3 is not energized both of the sliding surfaces are merely brought into a slight contact due to the pressure exerted by the spring 14. Because of the nature of the contacting surfaces having a slight coefficient of friction a sliding takes place and a slight couple is transmitted. Then upon energization of the coil 3 by means of the rheostat 24, 25 through the appropriate connections the armature 1 is attracted and creates initially a pressure between the sliding surfaces 6 and 47 so that a somewhat greater couple is transmitted. Upon increase of current the pressure between the contacting surfaces increases. When the magnetic field has reached a certain value the attraction upon the armature 1 becomes strong enough to distort the holder 46 and therefore the armature 1 is applied through an increasing surface against the electromagnet thereby increasing greatly the transmitted couple. When the magnetic field reaches its maximum there is an engagement by the entire armature with the entire electromagnet. Upon breaking the circuit the separation of the clutch elements is easier owing to the conical surface mentioned above.

In Fig. 7 a brake construction is shown in which the electromagnet 29 in the shape of a plate is to be braked. The electromagnet 29 has two sliding rings 36 and 37 while the portions of the surfaces of the armature 33, 34 located opposite to the rings 36, 37 have surfaces 47 similar to the surfaces 47 mentioned above.

As in the clutch construction shown in Fig. 3 the armatures which form the stationary portions of the brake are provided with a slight conical surface relative to the plane of the plate 29. The operation is the same as above described with respect to the electromagnet clutch. When the coil 30 is energized the sliding surfaces 47 are initially brought into contact with the sliding rings 36 and 37. Upon increase of current the armatures are distorted slightly in order to bring about a progressive greater and greater contact of their surfaces with the plate 29. Cutting the current permits an easy withdrawal of the armatures due to the conical character thereof under the action of the springs 45 encircling the shafts 43 which latter are secured to the casing 44.

It is obvious that various ways of carrying out the invention as described above may be realized and all modifications and variations thereof are claimed as will fall within the scope of the following claims.

Having thus described my invention, what I claim is:

1. In an electromagnetic device having an air gap and adapted for energized and non-energized phases, in combination, two elements, one of said elements being movable with relation to the other element, a metallic annulus of hard metal embedded in one of said elements, and the other element having a treated surface thereon opposite said annulus to cooperate therewith, said treated surface permitting constant contact between said annulus and surface during energized and non-energized phases of said device so that initial shock is eliminated by removing the air gap between said cooperating elements.

2. In an electromagnetic device having an air gap and adapted for energized and non-energized phases, in combination, two elements, one of said elements being movable with relation to the other element, a treated surface upon said movable element and the other element having a treated surface thereon opposite said first mentioned treated surface to cooperate therewith, said treated surfaces permitting constant contact between said elements during energized and non-energized phases of said device so that initial shock is eliminated by removing the air gap between said cooperating elements.

3. In an electromagnetic device having an air gap and adapted for energized and non-energized phases, in combination, two elements, one of said elements being movable with relation to the other element, said movable element having a treated surface thereon and the other element having an oxidized aluminum coating cooperating with said treated surface, said treated surface and said coated surface permitting constant contact between said elements during energized and non-energized phases of said device so that initial shock is eliminated by removing the air gap between said cooperating elements.

4. In an electromagnetic clutching device having an air gap and adapted for energized and non-energized phases, in combination, two elements, one of said elements being movable with relation to the other element, a metallic annulus of hard metal embedded in one of said elements, and the other element having a treated surface thereon opposite said annulus to cooperate therewith, said treated surface permitting constant contact between said annulus and surface during energized and non-energized phases of said device so that initial shock is eliminated by removing the air gap between said cooperating elements, and one of said elements having a conical configuration to assist in the progressive clutching of the contacting surfaces.

5. In an electromagnetic clutching device having an air gap and adapted for energized and non-energized phases, in combination, two elements, one of said elements being movable with relation to the other element, a treated surface upon said movable element and the other element having a treated surface thereon opposite said first mentioned treated surface to cooperate therewith, said treated surfaces permitting constant contact between said elements during energized and non-energized phases of said device so that initial shock is eliminated by removing the air gap between said cooperating elements, and said elements having surfaces of slightly conical configuration extending to said treated surfaces in order to aid in the progressive clutching and declutching.

6. In a device of the class described the combination comprising two elements, one of said elements constituting the electromagnetic element and the other the armature therefor so that relative movement may be induced with respect to said elements, a coil in said electromagnetic element, a metallic annulus of hard metal embedded in said electromagnetic element in front of said coil and the other element having a treated surface thereon opposite said annulus to cooperate therewith, said treated surface permitting constant contact between said annulus and surface during energized and non-energized phases of said device so that initial shock is eliminated by removing the air gap between said cooperating elements.

7. In a device of the class described the combination comprising two elements, one of said elements constituting the electromagnetic element and the other the armature therefor so that relative movement may be induced with respect to said elements, a coil in said electromagnetic element, a metallic annulus of hard metal embedded in said electromagnetic element in front of said coil, a metallic annulus of softer metal embedded in the other element cooperating with said first named annulus and said annuli permitting constant contact therebetween during energized and non-energized phases of said device so that initial shock is eliminated by removing the air gap between said cooperating elements.

LOUIS HUBERT.

REFERENCES CITED

The following references are of record in the file of this patent:

UNITED STATES PATENTS

| Number | Name | Date |
|---|---|---|
| Re. 12,581 | Schuster et al. | Dec. 18, 1906 |
| 665,321 | Garrett | June 1, 1901 |
| 730,621 | Eastwood | June 9, 1903 |
| 903,945 | Ast | Nov. 17, 1908 |
| 2,120,734 | Cotal | June 14, 1938 |
| 2,421,757 | Oetzel | July 10, 1947 |

FOREIGN PATENTS

| Number | Country | Date |
|---|---|---|
| 287,944 | Germany | July 12, 1914 |
| 893,952 | France | of 1944 |